(12) United States Patent
Johnson et al.

(10) Patent No.: US 6,751,216 B2
(45) Date of Patent: Jun. 15, 2004

(54) PROVIDING END-USER COMMUNICATION SERVICES OVER PEER-TO-PEER INTERNET PROTOCOL CONNECTIONS BETWEEN SERVICE PROVIDERS

(75) Inventors: Harold W. Johnson, Roach, MO (US); Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 391 days.

(21) Appl. No.: 09/947,807

(22) Filed: Sep. 5, 2001

(65) Prior Publication Data

US 2004/0008665 A1 Jan. 15, 2004

(51) Int. Cl.$^7$ ............................................. H04L 12/66
(52) U.S. Cl. ..................... 370/352; 370/356; 370/466
(58) Field of Search ................................ 370/351–356, 370/389, 400, 401, 465, 466, 467, 410

(56) References Cited

U.S. PATENT DOCUMENTS

| | | | |
|---|---|---|---|
| 6,484,210 B1 | * 11/2002 | Adriano et al. | 709/239 |
| 2002/0103850 A1 | * 8/2002 | Moyer et al. | 709/202 |
| 2002/0120759 A1 | * 8/2002 | Faccin et al. | 709/202 |
| 2002/0169887 A1 | * 11/2002 | MeLampy et al. | 709/231 |
| 2002/0186685 A1 | * 12/2002 | O'Brien et al. | 370/352 |
| 2003/0133454 A1 | * 7/2003 | Gallant et al. | 370/395.1 |

OTHER PUBLICATIONS

QoSWorks, Sitara Networks, Inc., Apr. 10, 2001; internet.
Contivity VPN Switches, A comprehensive product solution for IP VPN, Nortel Networks, Apr. 10, 2001; internet.
Subnet Bandwidth Manager–an overview; Technology Planning and Integration, Sprint.

* cited by examiner

*Primary Examiner*—Ajit Patel

(57) ABSTRACT

A second service provider is coupled to a first service provider over a peer-to-peer Internet Protocol (IP) connection. The first service provider is coupled to end-user systems over IP connections. The second service provider comprises a router, service portal, and packet telephony network. The router routes a first set of IP packets between the peer-to-peer IP connection and a service connection based on a first set of IP addresses in the first set of the IP packets. The router routes a second set of the IP packets between the peer-to-peer IP connection and an Internet backbone IP connection based on a second set of the IP addresses in the second set of the IP packets. The service portal exchanges the first set of the IP packets with the service connection. The service portal provides protocol conversion between the first set of the IP packets and a first set of the service packets. The service portal exchanges the first set of the service packets with the packet telephony network. The packet telephony network routes the service packets to provide telephony service.

30 Claims, 11 Drawing Sheets

PROVIDING END-USER COMMUNICATION SERVICES OVER PEER-TO-PEER INTERNET PROTOCOL CONNECTIONS BETWEEN SERVICE PROVIDERS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the use of peer-to-peer IP connections to extend the service reach of packet telephony networks.

2. Description of the Prior Art

Communication Service Provider Environment in the Prior Art

FIG. 1 illustrates a service provider environment in the prior art. End-user systems 130, 140, 150 are coupled to first service provider 110 over respective connections 131, 141, 151. End-user systems 160, 170, 180 are coupled to second service provider 120 over respective connections 161, 171, 181. First service provider 110 is coupled to public telephone network 100 and Internet 101 by respective connections 112 and 113. Second service provider 120 is coupled to public telephone network 100 and Internet 101 by respective connections 121, 122–123. First service provider 110 is coupled to second service provider 120 over peer-to-peer Internet Protocol (IP) connection 111.

FIG. 2 illustrates first service provider 110 in the prior art. First service provider 110 includes mux system 211, router 212, services network 213, telephony gateway 214, and internet gateway 215. Mux system 211 is coupled to router 212 and to connections 131, 141, 151 from end-user systems 130, 140, 150. Router 212 is coupled to services network 213, telephony gateway 214, and Internet gateway 215. Router 212 is also coupled to peer-to-peer IP connection 111 to second service provider 120. Telephony gateway 214 is coupled to connection 113 to public telephone network 100. Internet gateway 215 is coupled to connection 112 to Internet 101.

FIG. 3 illustrates second service provider 120 in the prior art. Second service provider 120 includes router 312 and packet telephony network 313. Router 312 is coupled to peer-to-peer IP connection 111 to first service provider 110 and connection 123 to Internet 101. Packet telephony network 313 is coupled to connections 161, 171, 181 to end-user systems 160, 170, 180. Packet telephony network 313 is also coupled to connection 122 to Internet 101 and to connection 121 to public telephone network 100.

Referring to FIGS. 1–3, end-user systems 130, 140, 150 use first service provider 110 to access public telephone network 100 and Internet 101. First service provider 110 provides telephony service through telephony gateway 214 and provides Internet access through Internet gateway 215. First service provider 110 may also provide other services through services network 213.

End-user systems 160, 170, 180 use second service provider 120 to access packet telephony network 313. Packet telephony network 313 provides telephone services and Internet access over a packet network. End-user systems 160, 170, 180 include interface devices for use between their computers or telephones and packet telephony network 313. Using end-user systems 160, 170, 180 and packet telephony network 313, available telephony features include: 3-way calling, call forwarding, message waiting notification, ring-again, caller ID, voice-activated dialing, unified messaging, and unified communications.

Unfortunately, end-users of first service provider 110 do not have effective access to packet telephony network 313. To access packet-based telephony, end-user systems 130, 140, 150 typically employ computer telephony over Internet 101. Computer telephony requires two fairly sophisticated end-users who configure their computers to operate like telephones—including microphone, speaker, telephone circuitry, and user interface—and then operate their computers to exchange voice IP packets with one another over Internet 101. For example, end-user systems 130, 140 would exchange voice IP packets over first service provider 110 and Internet 101. Computer telephony is much more complex than simply plugging-in a telephone and dialing a familiar number.

In contrast, end-users of second service provider 120 may plug standard telephones into their interface devices, and with relative ease, enjoy packet-based telephony service using a standard telephone. One example of a packet telephony network and associated end-user systems are the Integrated On-demand Network (ION) provided by Sprint Corporation.

Peer-to-Peer IP Connections in the Prior Art

Peer-to-peer IP connections are established between two different service providers to exchange IP traffic destined for the other service provider. It is important for a service provider to transfer this IP traffic as soon as possible to relieve other systems in that service provider from handling the traffic. For example, router 212 can transfer IP traffic to second service provider 120 over two different routes: 1) peer-to-peer IP connection 111, or 2) Internet gateway 215 and Internet 101. First service provider 110 wants to use peer-to-peer IP connection 111 whenever possible to reserve capacity through Internet gateway 215 for other IP traffic.

A brief discussion of IP addressing follows to further illustrate peer-to-peer IP connections. An Internet address is currently a 32-bit number that is comprised of four 8-bit blocks that are separated by decimals. It is expected that this addressing scheme will be expanded to a 128-bit number that is separated into four 32-bit blocks. An Internet address is also separated into a network part and a host part. The network part identifies the destination network, and the host part identifies the destination host on the destination network. Internet addresses are separated into classes based on how many bits are used for the network part and how many bits are used for the host part. Class "A" addresses use the first block for the network part and the final three blocks for the host part. Class "B" addresses use the first two blocks for the network part and the final two blocks for the host part. Class "C" addresses use the first three blocks for the network part and the final block for the host part.

Class A addresses are typically not used because the first block in an Internet address typically carries "www" for the world wide web, and the subnet on the web must be identified in the second and/or third blocks. Class B addresses are rare because if the first block identifies "www", then only eight bits remain to provide a mere 256 Class B addresses on the web.

Internet backbone providers carry large amounts of Internet traffic and typically host the largest and most popular websites. The rare Class B addresses are often used by Internet backbone providers to collect IP traffic for their portion of the backbone, and consequently, these Class B addresses are used by other service providers to quickly identify and dump IP traffic over peer-to-peer connections to the Internet backbone provider. In the above example, second service provider 120 could be an Internet backbone provider with Class B addresses. Thus, when router 212 receives Internet traffic with these class B addresses from end-user systems 130, 140, 150, router 212 transfers this IP traffic over peer-to-peer connection 111 to second service provider 120. This routing is far more efficient than transferring the IP traffic through Internet Gateway 215 and over internet 101 to second service provider 120.

Problems in the Prior Art

The above networking arrangement creates a serious problem for end-users. The service provider who owns the connection to the end-user has a near monopoly over local services for that end-user. Exorbitant costs prevent other service providers from deploying their own end-user connections in competition with existing service providers. The deregulation that was supposed to usher in local competition has yet to deliver a meaningful level of competition in some areas.

Most service providers do not offer any packet-based telephony services that have a legitimate Quality of Service (QoS). End-users are left with a few undesirable choices: order multiple phone lines, order an expensive T1 connection, or employ computer telephony over the Internet. End-users in remote areas may not even have all of these choices.

Unfortunately, computer telephony requires a computer as opposed to a telephone. The computer must be configured with a telephony user interface, including microphone, speaker, and computer telephony software. Computer telephony still requires a relatively sophisticated end-user.

The use of the Internet for computer telephony compounds the problem. The Internet offers only best effort delivery without any guaranteed QoS. The Internet may require 15 hops to reach a destination adding unacceptable delay to voice communications. The Internet offers little security and allows hackers to listen to unsophisticated users. Computer telephony over the Internet does not offer the robust features that some end-users desire, such as voice mail, operator assistance, and call forwarding.

SUMMARY OF THE INVENTION

The invention helps solve the above problems with technology that allows an end-user who is connected to a first service provider to obtain packet-based telephony services from a second service provider, even though the end-user is not directly connected to the second service provider. To access the packet-based telephony services of the second service provider, the end-user system uses an IP tunnel through both the first service provider and a peer-to-peer IP connection between the first and second service providers. Advantageously, the end-user may choose packet-based services from many service providers with peer-to-peer IP connections to the first service provider. This dramatically expands end-user choice and stimulates meaningful competition at the service level. The technology offers numerous other advantages.

The second service provider may implement the technology with few or no changes to their packet telephony network, so the system may be quickly and cheaply deployed. For a service provider with many existing peer-to-peer IP connections, the technology greatly expands potential service coverage areas—even to end-users in remote areas. The end-user obtains true QoS on packet-based telephony, and they may obtain many of the features that currently enjoy with conventional telephone services, such as voice mail and call forwarding. Because the technology restricts or eliminates use of the Internet, issues like communication delay and security are dramatically improved.

Some examples of the invention include a second service provider that is coupled to a first service provider over a peer-to-peer Internet Protocol (IP) connection. The first service provider is coupled to end-user systems over IP connections. The second service provider comprises a router, service portal, and packet telephony network. The router routes a first set of IP packets between the peer-to-peer IP connection and a service connection based on a first set of IP addresses in the first set of the IP packets. The router routes a second set of the IP packets between the peer-to-peer IP connection and an Internet backbone IP connection based on a second set of the IP addresses in the second set of the IP packets. The service portal exchanges the first set of the IP packets with the service connection. The service portal provides protocol conversion between the first set of the IP packets and a first set of the service packets. The service portal exchanges the first set of the service packets with the packet telephony network. The packet telephony network routes the service packets to provide telephony service.

In some examples of the invention, the end-user systems exchange the first set of the IP packets including the first set of the IP addresses with the first service provider over the IP connections, and the first service provider routes the first set of the IP packets to the second service provider over the peer-to-peer IP connection based on the first set of the IP addresses.

In some examples of the invention, the first set of the IP packets from the end-user systems include packet telephony network addresses and the service portal replaces the first set of the IP addresses in the first set of the IP packets from the end-user systems with the packet telephony network addresses.

In some examples of the invention, the service packets comprise ATM cells and the packet telephony network is configured to route the ATM cells to provide the telephony service.

In some examples of the invention, the first set of the IP packets encapsulate the ATM cells.

In some examples of the invention, the first set of the IP packets is not routed over a public Internet.

In some examples of the invention, the first set of the IP packets carries telephony voice and signaling.

In some examples of the invention, the first set of the IP addresses and the second set of the IP addresses comprise Class B addresses for the second service provider.

In some examples of the invention, the first set of the IP addresses comprise Class B addresses for the packet telephony network in the second service provider.

In some examples of the invention, the service portal uses dynamically-assigned end-user IP addresses.

BRIEF DESCRIPTION OF THE DRAWINGS

The same reference number represents the same element on all drawings.

DETAILED DESCRIPTION OF THE PREFERRED EMBODIMENT

FIGS. 4–9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
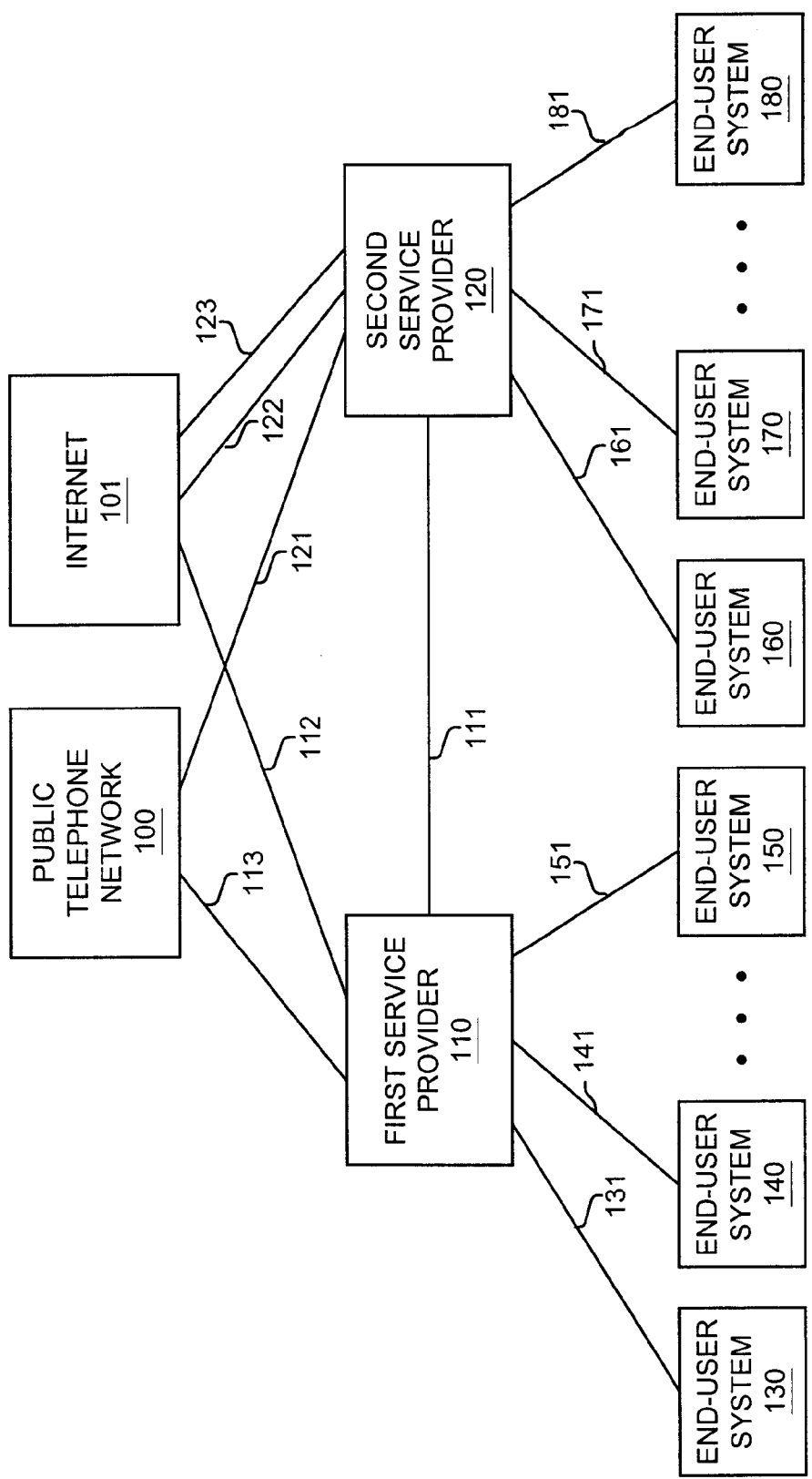
FIG. 1 illustrates a communication service provider environment in the prior art.
Figure 2:
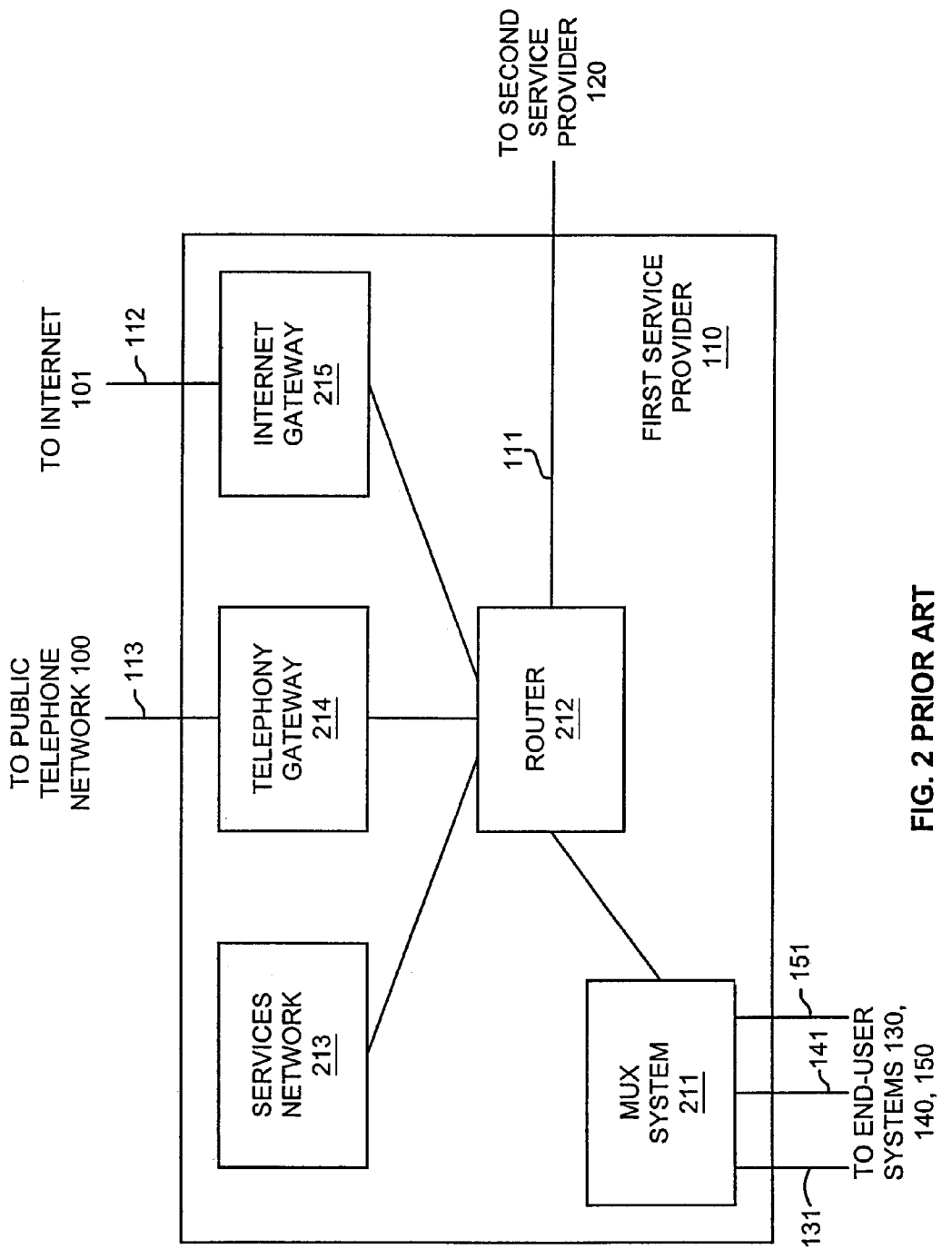
FIG. 2 illustrates a first service provider in the prior art.
Figure 3:
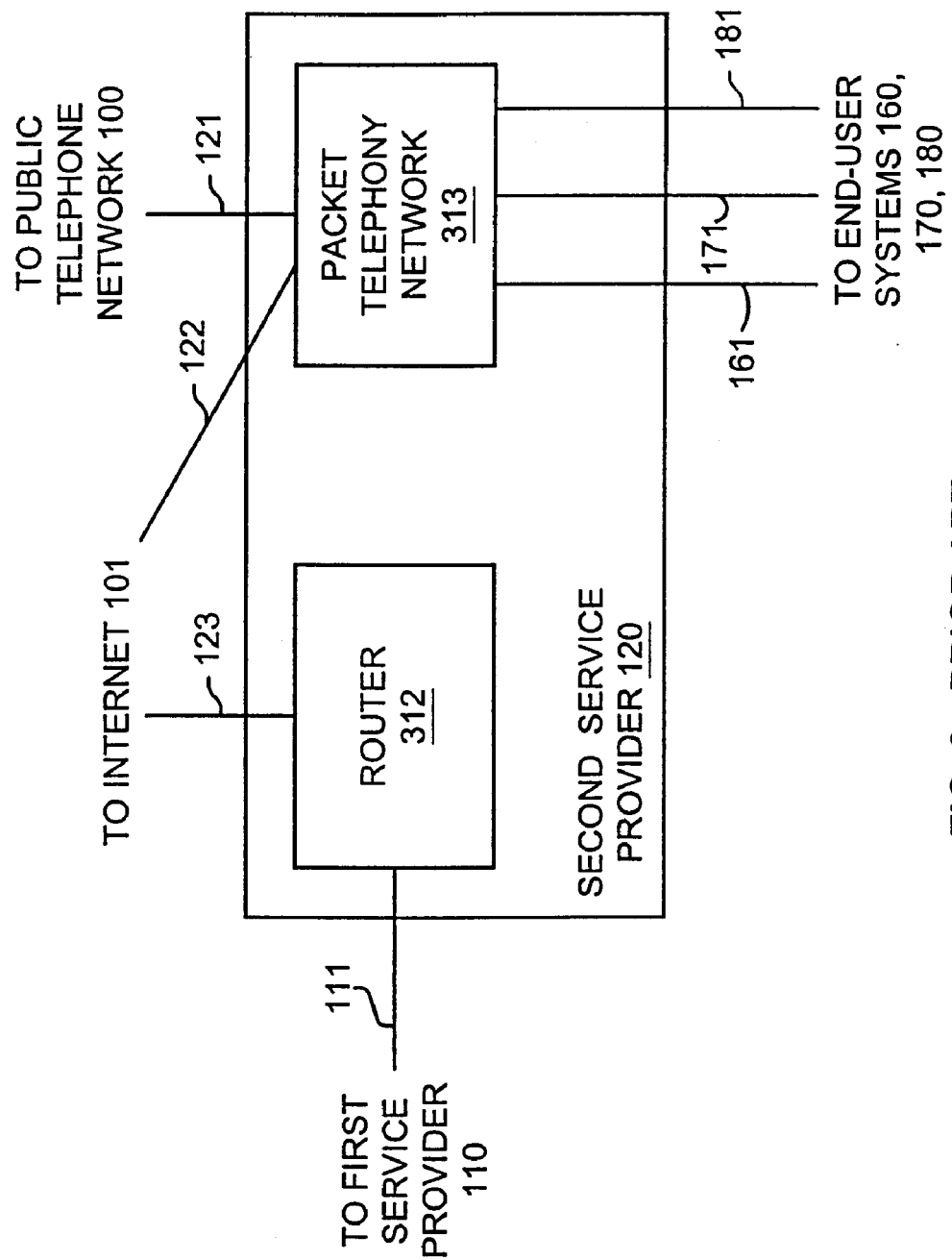
FIG. 3 illustrates a second service provider in the prior art.
Figure 4:
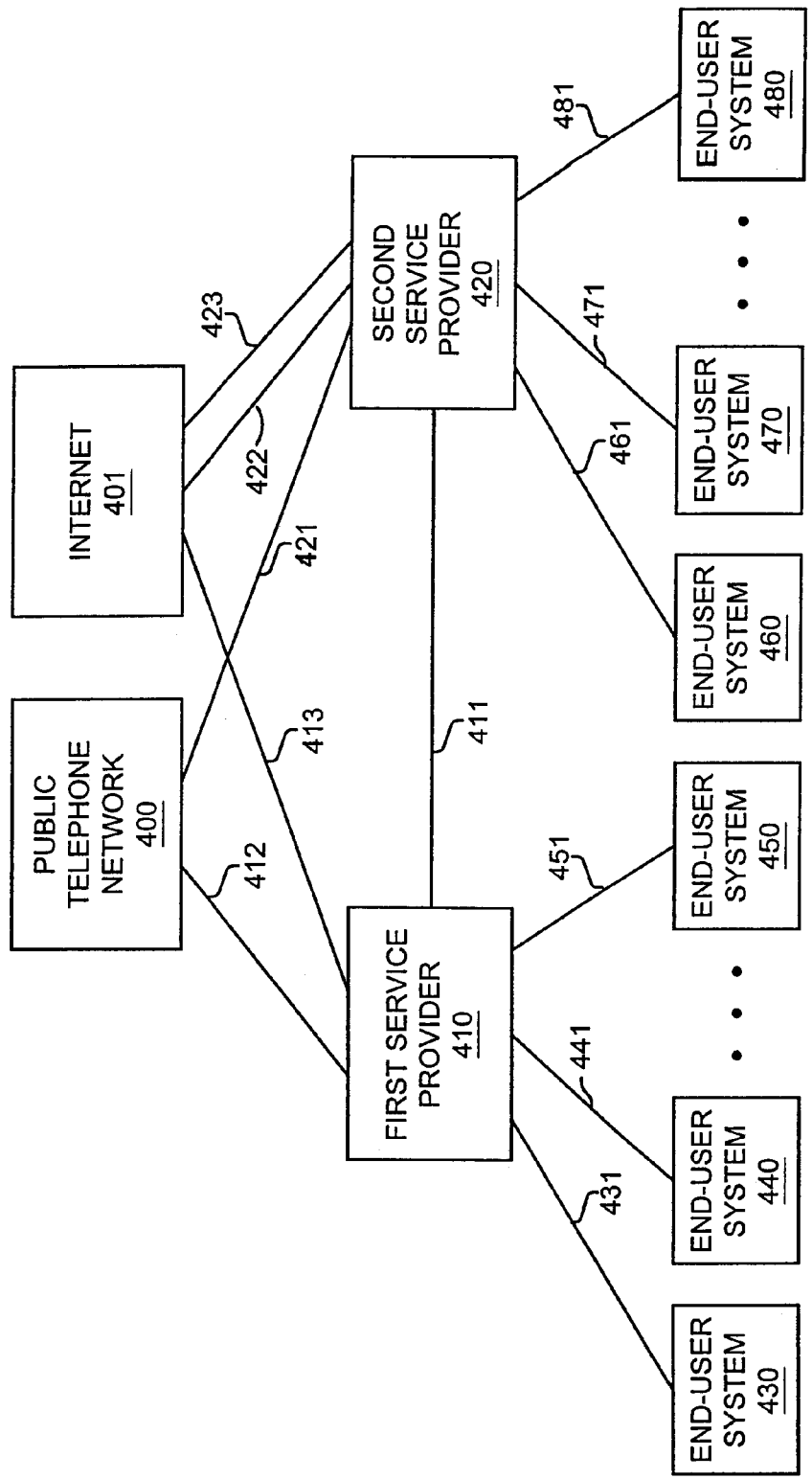
FIG. 4 illustrates a communication service provider environment in an example of the invention.
Figure 5:
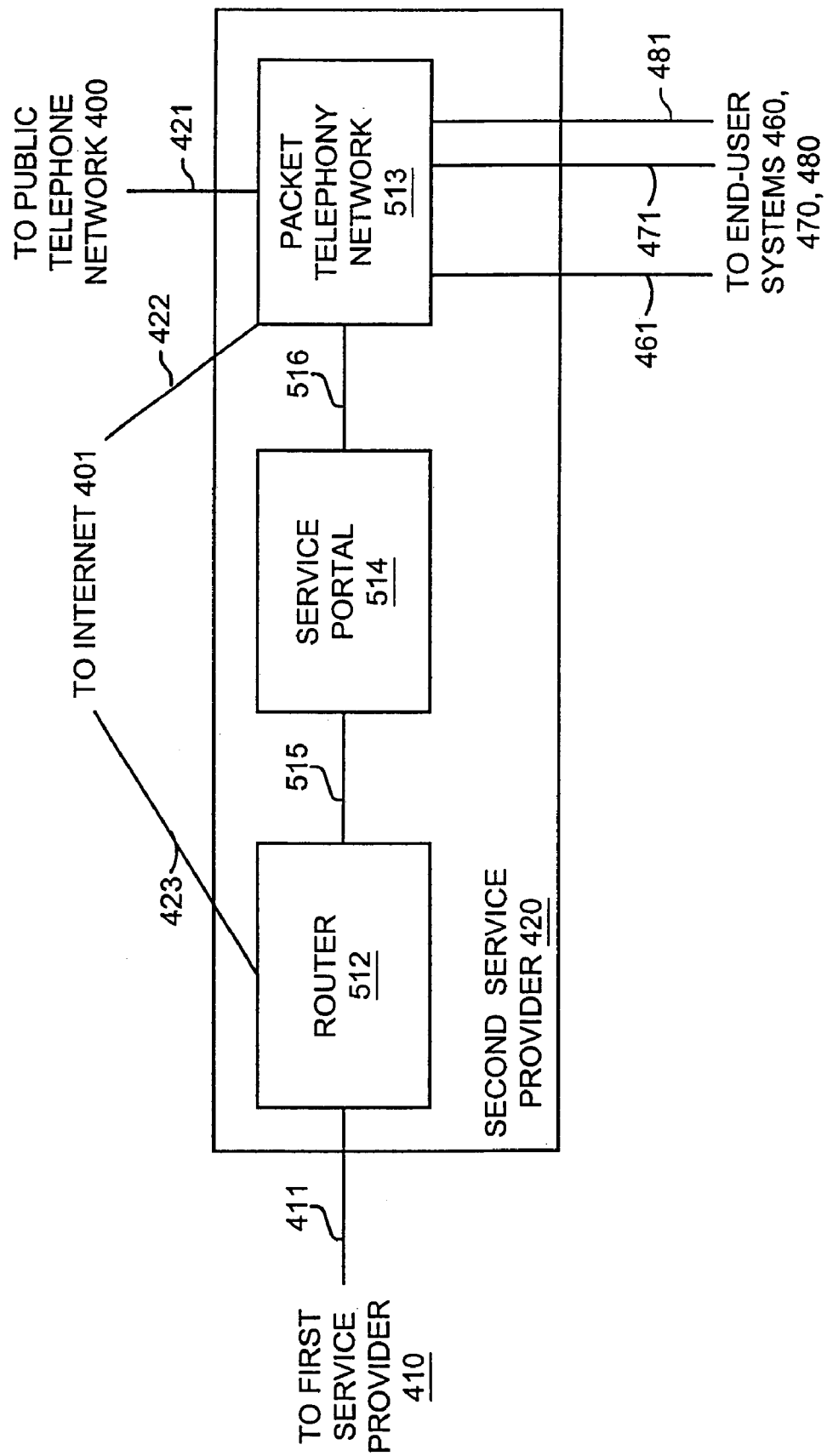
FIG. 5 illustrates a second service provider in an example of the invention.
Figure 6:
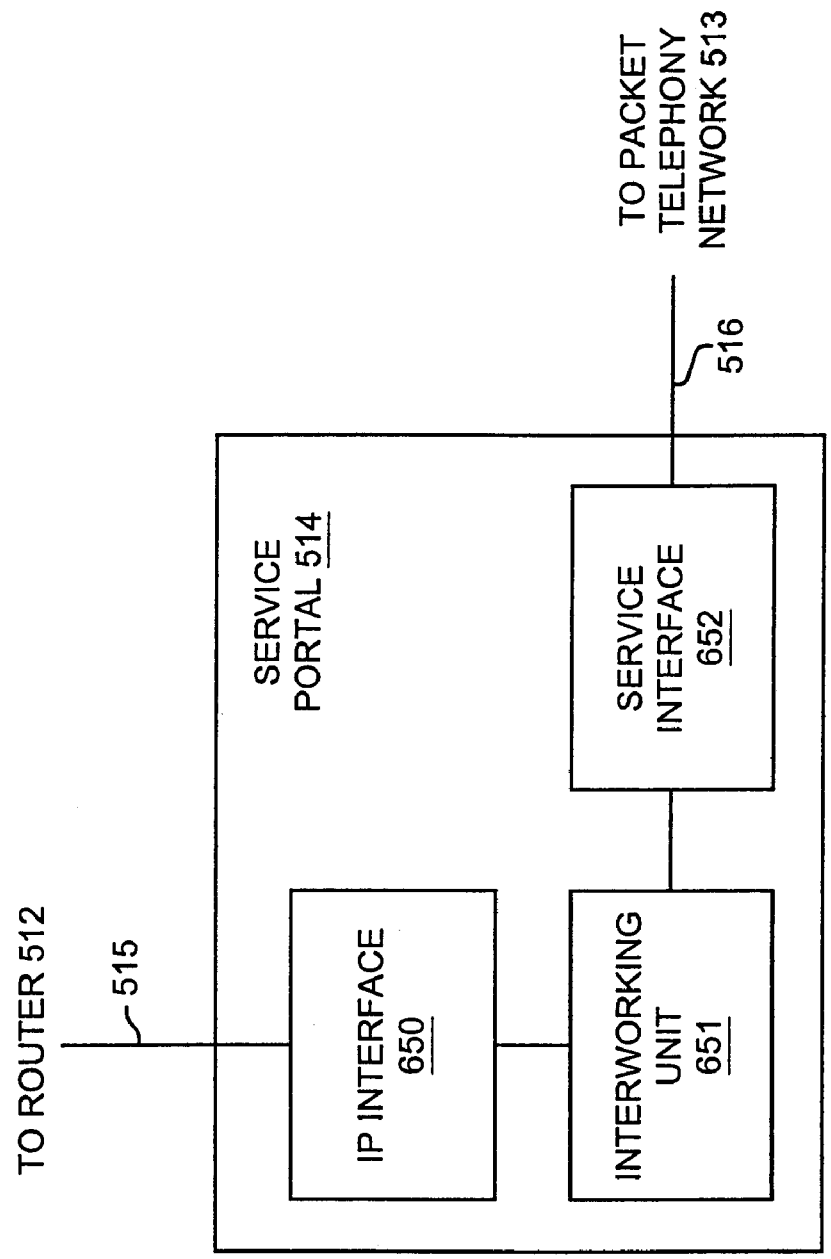
FIG. 6 illustrates a service portal in an example of the invention.

Communication Service Provider Environment—FIGS. 4–6

FIG. 4 illustrates a service provider environment in the prior art. End-user systems 430, 440, 450 are coupled to first service provider 410 over respective connections 431, 441, 451. End-user systems 460, 470, 480 are coupled to second service provider 420 over respective connections 461, 471, 481. First service provider 410 is coupled to public telephone network 400 and Internet 401 by respective connections 412 and 413. Second service provider 420 is coupled to public telephone network 400 and Internet 401 by respective connections 421, 422–423. First service provider 410 is coupled to second service provider 420 over peer-to-peer IP connection 411.

In the context of the invention, a "service provider" means a corporate entity that offers communication services to end-users. Different corporate entities that do not exert majority-ownership over one another comprise "different service providers". For example, AT&T, WorldCom, Sprint, British Telecom, NT&T, Verizon, SBC, Qwest, and Bell South are current examples of different service providers. In the context of the invention, a "peer-to-peer IP connection" means an IP connection between different service providers that is established by mutual agreement for the exchange of IP traffic.

If desired, the following elements could be the same as in the prior art—although modifications may still be made without deviating from the invention: first service provider 410, public telephone network 400, Internet 401, end-user systems 460, 470, 480, and connections 411–413, 421–423, 431,441,451, 461, 471, 481.

End-user systems 430, 440, 450 could be stand-alone enclosures with internal circuitry, software, and interfaces; computers having network and telephony interfaces and running specialized software; communications devices, such as telephones and personal digital assistants, with embedded functionality; or some other properly configured device or system. Connections 431, 441, 451 could be twisted pair wires, coaxial cable, optical fiber, wireless link, or some other type of communication connection. Connections 431, 441, 451 may utilize Digital Subscriber Line (DSL), spread spectrum, Ethernet, Internet Protocol (IP), Asynchronous Transfer Mode (ATM), or some other protocol. It should be understood that interface components, such as modems and transceivers, could either be a part of end-user systems 430, 440, 450, or a part of connections 431, 441, 451.

FIG. 5 illustrates second service provider 420 in the prior art. Second service provider 420 includes router 512, packet telephony network 513, and service portal 514. Router 512 is coupled to peer-to-peer IP connection 411 to first service provider 410. Router 512 is coupled to IP backbone connection 423 to Internet 401. Router is coupled to service connection 515 to service portal 514. Packet telephony network 513 is coupled to connections 461, 471, 481 to end-user systems 460, 470, 480. Packet telephony network 513 is coupled to IP connection 422 to Internet 401. Packet telephony network 513 is coupled to telephony connection 421 to public telephone network 400. Packet telephony network 513 is coupled to service connection 516 to service portal 514.

If desired, all elements in second service provider 420, except for service portal 514 and service connections 515–516, could be the same as in the prior art—although modifications may still be made without deviating from the invention. In some examples of the invention, service connection 515 is an IP connection, and service connection 516 is an ATM connection, but service connections 515–516 could use other protocols.

Referring to FIGS. 4–5, end-user systems 430, 440, 450 and service portal 514 exchange a first set of IP packets that carry telephony voice and signaling by placing a first set of IP addresses in these IP packets. First service provider 410 routes the first set of IP packets between end-user connections 431, 441, 451 and peer-to-peer IP connection 411 based on the first set of IP addresses. Router 512 routes the first set of IP packets between peer-to-peer IP connection 411 and service connection 515 based on the first set of IP addresses. For packet transfers from end-user systems 430, 440, 450 to service portal 514, these IP addresses could be Class B IP addresses for second service provider 420 that identify packet telephony network 513. For packet transfers from service portal 514 to end-user systems 530, 540, 550, these IP addresses could be end-user IP addresses. Thus, Point-to-Point Protocol Internet over Ethernet (PPPOE) tunnels may be established between end-user devices 430, 440, 450 and service portal 514 using proper IP addressing, such as a class B address for second service provider 420 and the IP addresses for the end-users. Advantageously, the first set of IP packets is not routed over Internet 401, and as a result, security and service control is dramatically improved. Using end-user systems 430, 440, 450 and packet telephony network 313, available telephony features include: 3-way calling, call forwarding, message waiting notification, ring-again, caller ID, voice-activated dialing, unified messaging, and unified communications.

End-user systems 430, 440, 450 and Internet 401 may exchange a second set of IP packets by placing a second set of IP addresses in these IP packets. First service provider 410 routes the second set of IP packets between end-user connections 431, 441, 451 and peer-to-peer IP connection 411 based on the second set of IP addresses. Router 512 routes the second set of IP packets between peer-to-peer IP connection 411 and Internet backbone IP connection 423 based on the second set of IP addresses. For packet transfers from end-user systems 430, 440, 450 to Internet 401, these IP addresses could be Class B IP addresses for second service provider 420 that identify Internet 401. For packet transfers from Internet 401 to end-user systems 530, 540, 550, the second set of IP addresses could be the same end-user IP addresses as in the first set.

FIG. 6 illustrates service portal 514 in an example of the invention. Service portal 514 includes IP interface 650, interworking unit 651, and service interface 652. IP interface 650 is coupled to service connection 515 and interworking unit 651. Service interface 652 is coupled to interworking unit 651 and service connection 516.

IP interface 650 exchanges the first set of IP packets between service connection 515 and interworking unit 651. Interworking unit 651 provides protocol conversion between the first set of IP packets and a first set of service packets. Protocol conversion may comprise replacing the IP address with an address suitable for packet telephony network 513. Service interface 652 exchanges the first set of service packets between interworking unit 651 and service connection 516.

Packet telephony network 513 is configured to route service packets between network ports to provide telephony service through the network ports. Service connection 516 is coupled to a first set of these network ports. Thus, packet telephony network 513 provides telephony service to end-user systems 530, 540, 550 through the first set of network ports.

Advantageously, service portal 514 is designed to minimize or eliminate changes to first service provider 410 and second service provider 420. First service provider 410 exchanges IP packets between connections 411, 431, 441, 451 as in the prior art. Router 512 exchanges IP packets with service portal 514 as it does with Internet 401. Packet telephony network 513 exchanges service packets with service portal 514 as it would with network ports for connections 461, 471, 481. Based on this disclosure, those skilled in the art will appreciate how to modify existing products, such as Redback equipment, to make and use service portal 514.

End-user systems 430, 440, 450 place addresses for packet telephony network 513 in the body of the first set of IP packets transferred to service portal 514. To perform protocol conversion on these IP packets, service portal 514 replaces the first set of IP addresses with the packet telephony network addresses in the body of the IP packets. For IP packets transferred to end-user systems 430, 440, 450, interworking unit 513 may maintain and use a list of dynamically-assigned end-user IP addresses.

In some examples of the invention, the service packets comprise ATM cells and packet telephony network 513 is configured to route the ATM cells between the network ports to provide telephony service with a guaranteed Quality-of-Service. In these examples of the invention, the first set of IP packets may encapsulate the ATM cells, so service portal may strip off the IP wrapper and transfer the de-encapsulated ATM cells to service connection 516. Service portal 514 may use various technologies such as Media Gateway Control Protocol (MGCP), Simple Gateway Control Protocol (SGCP), Simple Internet Protocol (SIP), IP, ATM, IPSEC, and IEEE 802.1P and 1Q.

Consider an example where end-user system 430 makes a packet telephony call to end-user system 480. To establish the call connection, end-user system 430 will send signaling to packet telephony network 513. End-user system 430 addresses the signaling to a service node in packet telephony network 513 and encapsulates the signaling in an IP wrapper with a first set IP address. Based on the first set IP address, first and second service providers 410, 420 route the signaling to service portal 514. Service portal 514 replaces the first set IP address with the service node address and forwards the signaling to packet telephony network 513. Packet telephony network 513 routes the signaling to the service node. The service node notifies end-user system 480 of the incoming call and establishes call connections through packet telephony network 513.

For voice packets from end-user system 430 to end-user system 480, end-user system 430 addresses the voice packets to end-user system 480 and encapsulates the voice packets in an IP wrapper with a first set IP address. Based on the first set IP address, first and second service providers 410, 420 route the voice packets to service portal 514. Service portal 514 replaces the first set IP address with the end-user 480 address and forwards the voice packets to packet telephony network 513. Packet telephony network 513 routes the voice packets to end-user 480.

For voice packets from end-user system 480 to end-user system 430, end-user system 480 addresses the voice packets to end-user system 430. Based on the end-user system 430 address, packet telephony network 513 routes the voice packets to service portal 514. Service portal 514 and first service provider 410 route these voice packets to end-user 430 based on the end-user 430 address. In some cases, service portal 514 may encapsulate ATM voice cells addressed to end-user 430 in an IP wrapper with and end-user 430 IP address.

Figure 7:
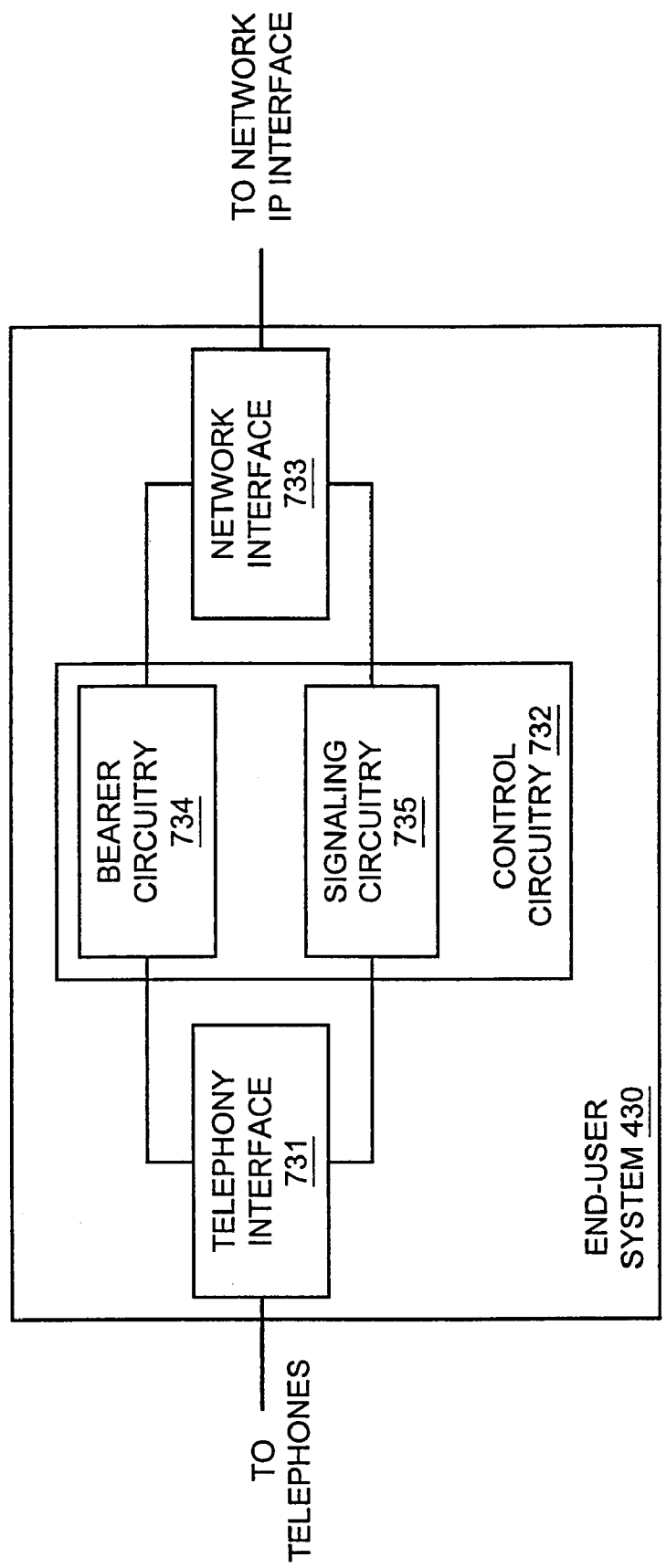
FIG. 7 illustrates an end-user system in an example of the invention.
Figure 8:
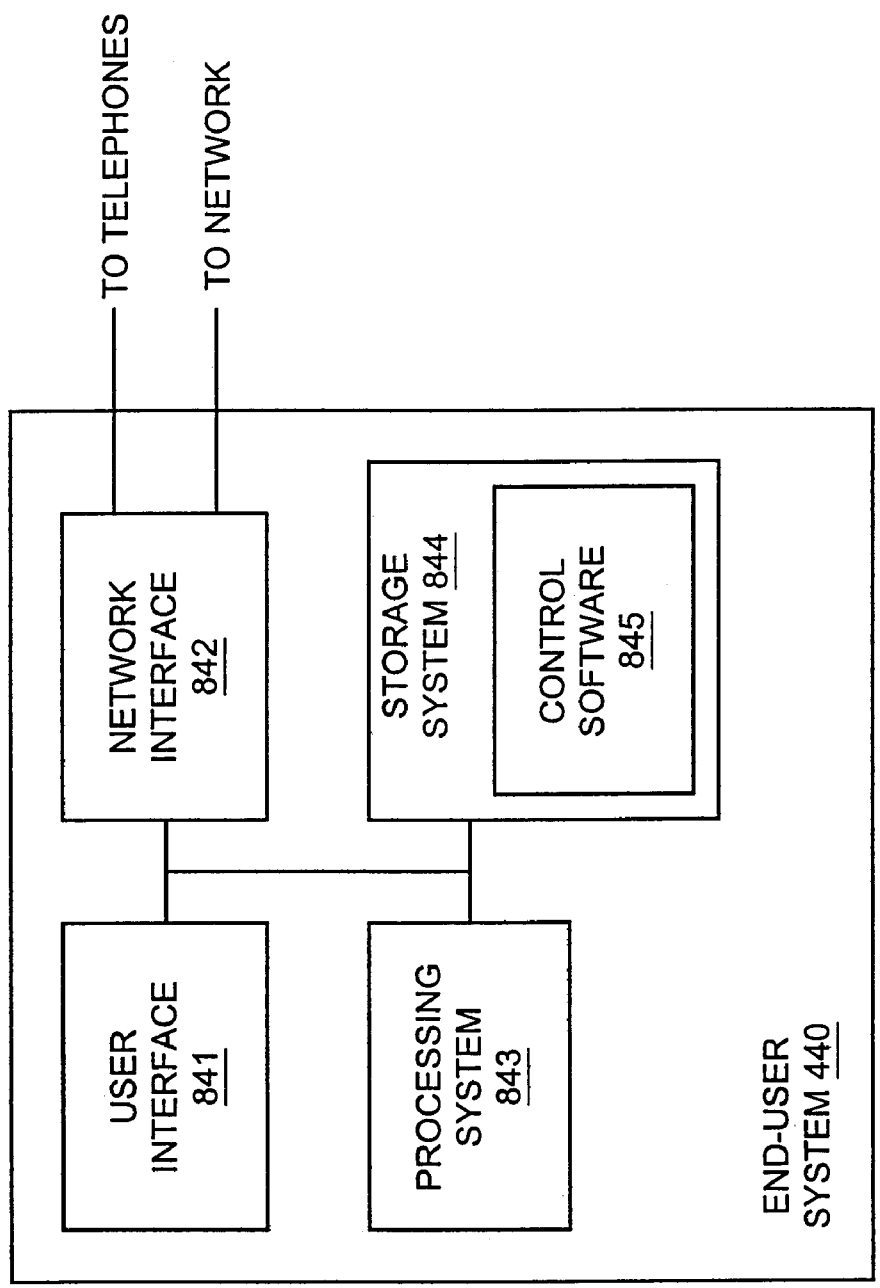
FIG. 8 illustrates an end-user system in an example of the invention.

End-User Systems—FIGS. 7–8

FIG. 7 illustrates end-user system 430 in an example of the invention. End-user system 430 includes telephony interface 731, control circuitry 732, and network interface 733. Control circuitry includes bearer circuitry 734 and signaling circuitry 735. Telephony interface 731 and network interface 733 are both coupled to bearer circuitry 734 and signaling circuitry 735.

Telephony interface 731 exchanges telephony signals with a telephone connection to telephones. For conventional analog telephones, these signals include: power, dial tone, digit tones, ring current, ringback, slow and fast busy, caller ID, and message waiting. In some cases, end-user system 430 may be integrated into a telephone. In these cases the telephony signals from telephony interface 731 would drive the telephone to process or generate the telephony signals described above.

Network interface 733 exchanges IP packets with a network IP interface for connection 431, and the special addressing required for these packets is discussed below. A modem may be included within network interface 733 or as a part of connection 430. Typically, the end-user may have an existing modem that can be used, so network interface 733 could be configured to link in to the existing modem, or it could be configured with a modem of its own.

Control circuitry 732 provides the interface between telephony interface 731 and network interface 733. Bearer circuitry 734 processes voice signals, and signaling circuitry 735 processes the telephony signaling required to set-up and tear down telephone calls. Control circuitry 732 manages services including voice telephony, video/audio file transfer, subnet bandwidth management, packet admission control, packet prioritization, packet QoS, and packet security. Control circuitry 732 may use various technologies such as MGCP, SGCP, SIP, IP, ATM, IPSEC, Resource Reservation Set-up Protocol (RSVP), Diffserv Protocol, Subnetwork Bandwidth Management (SBM), and IEEE 802.1P and 1Q. Through packet telephony network 513 and end-user system 430, available telephony features include: 3-way calling, call forwarding, message waiting notification, ring-again, caller ID, voice-activated dialing, unified messaging, and unified communications. Based on this disclosure, those skilled in the art will appreciate how to modify existing end-user equipment, such as end-user systems 160, 170, 180, to make and use end-user system 430.

End-user system 430 must be configured to properly address IP packets to ensure delivery to service portal 514 over peer-to-peer IP connection 411. Consider a first set of IP packets directed to packet telephony network 513 from end-user system 430. Control circuitry 732 places both a first IP address and packet telephony network addresses in the first set of the IP packets. Using the first IP address, first service provider 410 routes the first set of IP packets over peer-to-peer IP connection 411 to second service provider 420, and second service provider 420 routes the first set of the IP packets to service portal 514. Service portal 514 replaces the first IP address with the packet telephony network addresses and forwards these packets to packet telephony network 513. Packet telephony network 513 provides telephony services to the first set of packets based on the network addresses.

In some examples, control circuitry 732 generates ATM cells with network addresses that are suitable for packet telephony network 513. These ATM cells may themselves encapsulate IP packets that use MGCP and IPSEC. The ATM cells are then encapsulated in IP packets that have the Class B IP address for service portal 514. Service portal 514 merely strips off the external IP wrapper and provides the ATM cells to packet telephony network 513. Thus, service portal 514 appears to packet telephony network 514 as a group of end-users (i.e. 460, 470, 480).

For packet transfers from service portal 514 to end-user systems 430, 440, 450, service portal 514 uses end-user IP addresses that may be dynamically assigned and tracked. End-user system 430 may handle these packets in the normal fashion or may strip off the IP wrapper to process an encapsulated ATM cell.

End-user system 430 could comprise a single stand-alone enclosure. End-user system 430 could be integrated into a telephone. End-user system 430 could use a microprocessor in a personal computer for control circuitry 732 with telephony interface 731 and network interface 733 located on a computer card.

FIG. 8 illustrates end-user system 440 in an example of the invention. End-user system 440 includes user interface 841, network interface 842, processing system 843, and storage system 844. Storage system 844 stores control software 845. Processing system 843 is linked to user interface 841, network interface 842, and storage system 843.

End-user system 440 could be comprised of a programmed general-purpose computer, although those skilled in the art will appreciate that programmable or special purpose circuitry and equipment may be used. End-user system 440 may use a client server architecture where operations are distributed among a server system and client devices that together comprises elements 841–845.

User interface 841 could comprise a microphone, speaker, keyboard, mouse, voice recognition interface, graphical display, touchscreen, or some other type of user device. Network interface 842 could comprise a network interface card or some other communication device. Network interface 842 may be distributed among multiple communication devices. Network interface 842 may have a modem and telephone jacks to respectively interface with connection 441 and analog telephones.

Processing system 843 could comprise a computer microprocessor, logic circuit, or some other processing device. Processing system 843 may be distributed among multiple processing devices. Storage system 844 could comprise a disk, tape, integrated circuit, server, or some other memory device. Storage system 844 may be distributed among multiple memory devices.

Processing system 843 retrieves and executes control software 845 from storage system 844. Control software 845 could comprise an application program, firmware, or some other form of machine-readable processing instructions. When executed by processing system 843, control software 845 directs processing system 843 to operate in accord with the invention.

Processing system 843 controls the telephone jacks to exchange telephony signals with a telephone connection to the telephones. For conventional analog telephones, these signals include: power, dial tone, digit tones, ring current, ringback, slow and fast busy, caller ID, and message waiting. Processing system 843 may also control user interface components, such as display, microphone, and speaker, to provide telephony service through user interface 841. Processing system 843 controls the modem to exchange IP packets with connection 441.

Processing system 843 processes voice signals and telephony signaling. Processing system 843 manages services including voice telephony, video and audio file transfer, subnet bandwidth management, packet admission control, packet prioritization, packet QoS, and packet security. Processing system 843 may use various technologies such as MGCP, SGCP, SIP, IP, ATM, IPSEC, Resource Reservation Set-up Protocol (RSVP), Diffserv Protocol, Subnetwork Bandwidth Management (SBM), and IEEE 802.1P and 1Q. Through packet telephony network 513 and end-user system 440, available telephony features include: 3-way calling, call forwarding, message waiting notification, ring-again, caller ID, voice-activated dialing, unified messaging, and unified communications. Based on this disclosure, those skilled in the art will appreciate how to configure existing computers to make and use end-user system 440.

Processing system 843 must be configured to properly address IP packets to ensure delivery to service portal 514 over peer-to-peer IP connection 411. For a first set of IP packets directed to packet telephony network 513 from end-user system 440, processing system 843 places both a first IP address and packet telephony network addresses in the first set of the IP packets. Using the first IP address, first service provider 410 routes the first set of IP packets over peer-to-peer IP connection 411 to second service provider 420, and second service provider 420 routes the first set of the IP packets to service portal 514. Service portal 514 replaces the first IP address with the packet telephony network addresses and forwards these packets to packet telephony network 513. Packet telephony network 513 provides telephony services to the first set of packets based on the network addresses.

In some examples, processing system 843 generates ATM cells with network addresses that are suitable for packet telephony network 513. These ATM cells may themselves encapsulate IP packets that use MGCP and IPSEC. The ATM cells are then encapsulated in IP packets that have the Class B IP address for service portal 514. Service portal 514 merely strips off the external IP wrapper and provides the ATM cells to packet telephony network 513. Thus, service portal 514 appears to packet telephony network 514 as a group of end-users (i.e. 460, 470, 480).

For packet transfers from service portal 514 to end-user systems 430, 440, 450, service portal 514 uses end-user IP addresses that may be dynamically assigned and tracked. Processing system 843 may handle these packets in the normal fashion or may strip off the IP wrapper to process an encapsulated ATM cell.

Figure 9:
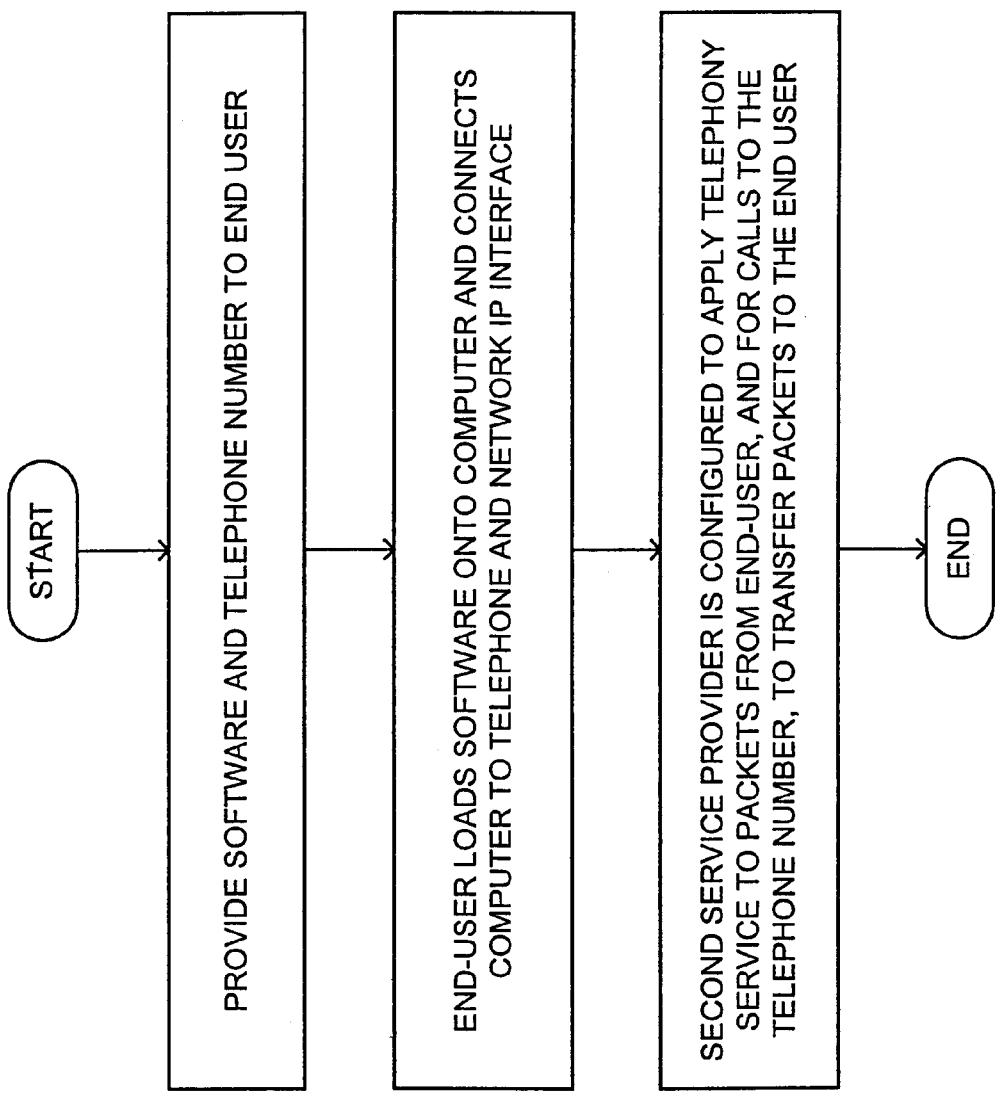
FIG. 9 illustrates a method for establishing telephony service for an end-user in an example of the invention.

Telephony Service Ordering—FIG. 9

FIG. 9 illustrates a method for establishing telephony service for an end-user. The end-user is provided with software and a telephone number. The software and telephone number may be provided to the end-user user through a world wide web site. The web site may also be used to receive from the end-user an end-user software registration, a grade-of-service selection, and a telephony service payment plan selection. For example, the user may register their software to receive technical support. The end-user may select a grade-of-service suitable for a home-office. The end-user may select a monthly flat rate payment plan that is billed to an office address.

The end-user loads the software onto to a computer and connects the computer to a telephone and to an Internet Protocol (IP) interface to a first service provider. If the software is downloaded from the web, loading in essentially automatic. This software is configured to direct the computer to operate as described above with respect to FIG. 8.

The second service provider is configured to provide packet-based telephony service to the end-user. The packet telephony system is configured to route packets directed toward the end-user to the service portal. For IP packets from the end-user, the service portal is configured to replace the first set IP address with the packet telephony network addresses. For IP packets to the end-user, the service portal is configured to track and use dynamically-assigned end-user IP addresses. For telephone calls to the telephone number, the packet telephony network is configured to establish call connections to the service portal for packet delivery to the end-user over the peer-to-peer IP connection.

In a variation to the above method, the end-user obtains a communication device from a retail establishment. The end-user accesses a web site to receive their telephone number, register their device, select a grade-of-service, and select a telephony service payment plan. The end-user connects the communication device to a telephone and to an IP interface to a first service provider. The communication device is configured to operate as described above with respect to FIG. 7. The second service provider is configured to provide packet-based telephony service to the end-user as described above.

Figure 10:
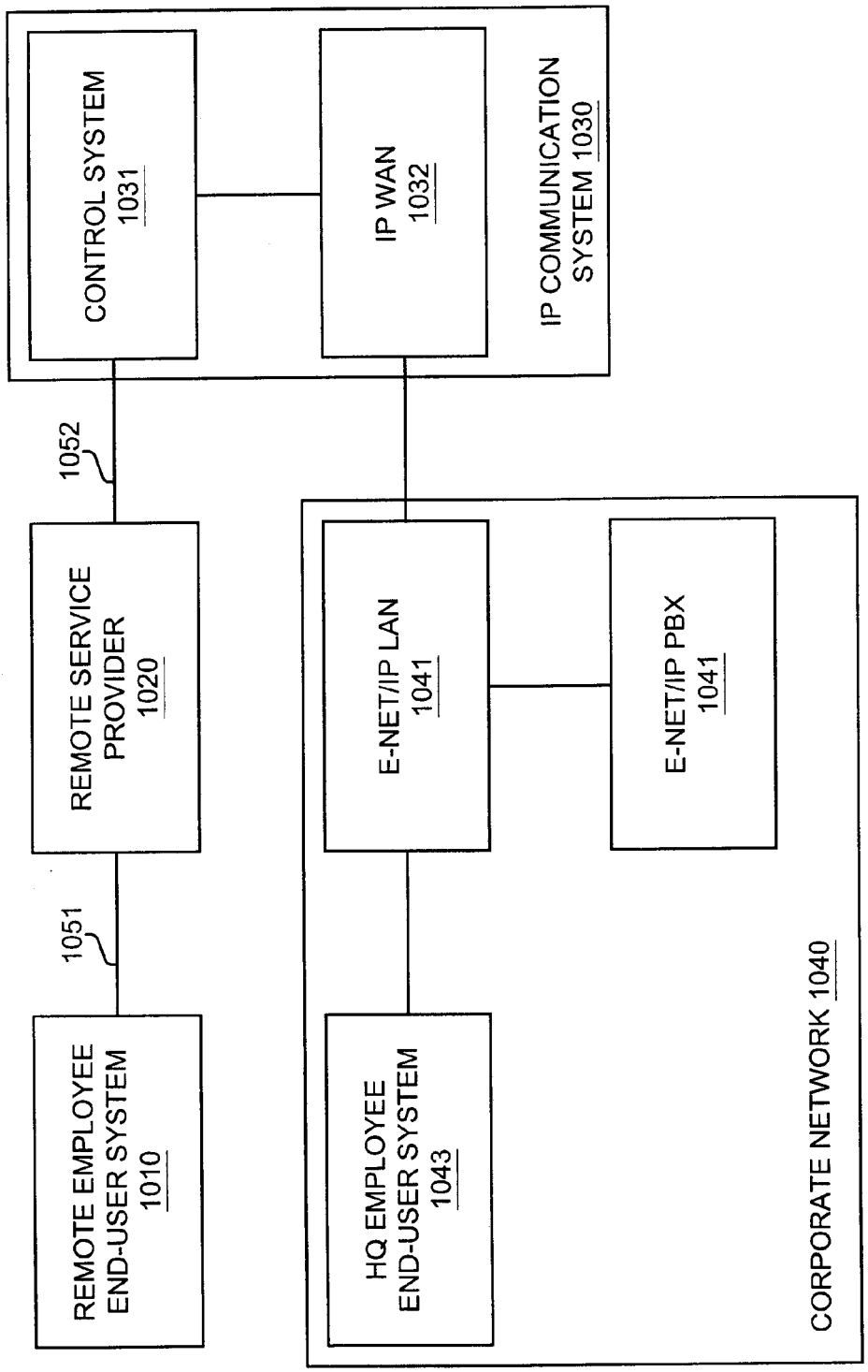
FIG. 10 illustrates a service example for a remote employee.
Figure 11:
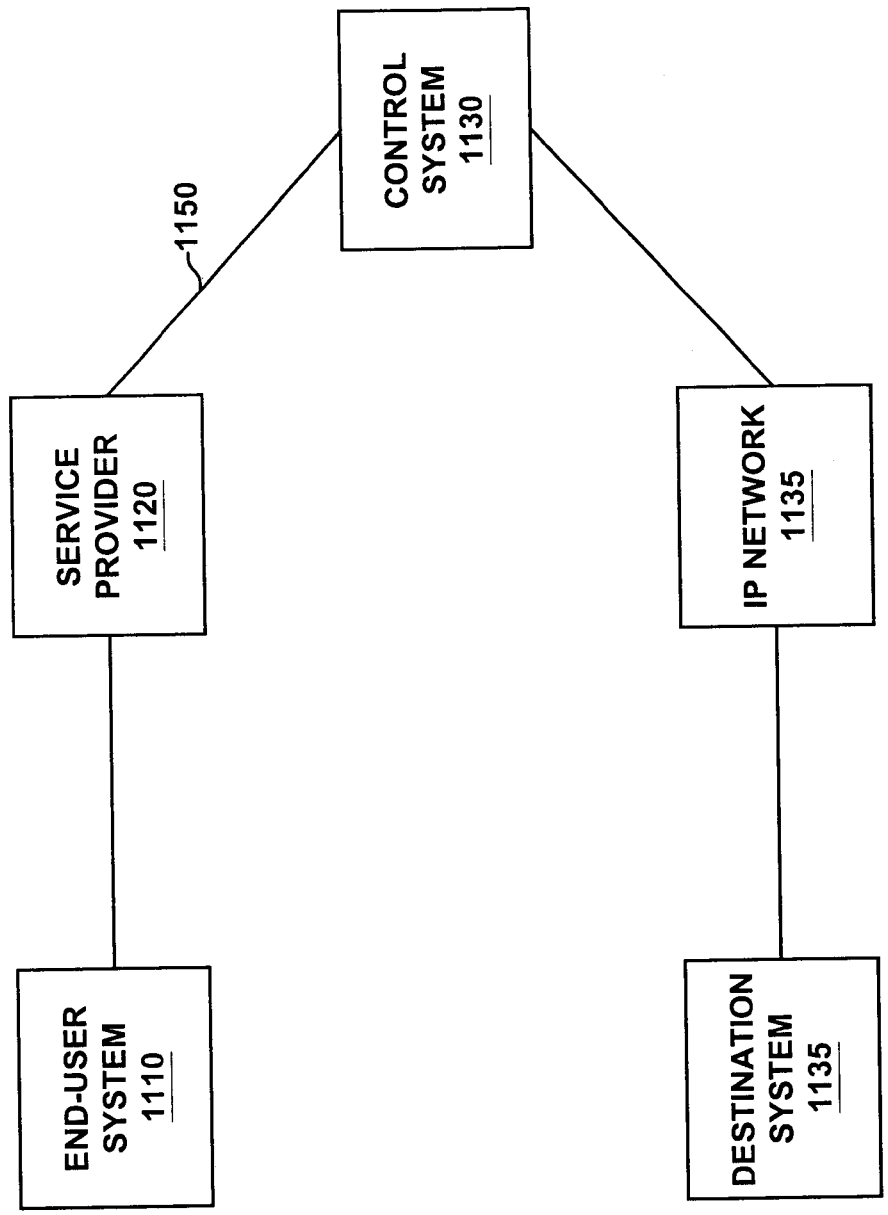
FIG. 11 illustrates another service example.

Communication Service Examples—FIGS. 10–11

FIG. 10 illustrates a service example for a remote employee. Consider a situation where an employee has a home office that is distant from their corporate headquarters. The invention is readily applicable to this situation. FIG. 10 shows remote employee user system 1010, remote employee service provider 1020, IP communication system 1030, and corporate network 1040. IP communication system 1030 includes control system 1031 and IP Wide Area Network (WAN) 1032. Corporate network 1040 includes Ethernet/IP Local Area Network (LAN) 1041, IP PBX 1042, and HQ employee user system 1043. Remote employee end-user system 1010 could be similar to one of the end-user systems described above. Control system 1031 could be similar to the service portal described above.

Remote employee user system 1010 and remote service provider 1020 exchange Ethernet/IP packets over Ethernet/IP connection 1051. Remote service provider 1020 and control system 1031 exchange Ethernet/IP packets over peer-to-peer Ethernet/IP connection 1052. Thus, a first Ethernet/IP system is comprised of end-user system 1010, connections 1051–1052, and control system 1031. IP WAN 1032 exchanges IP packets with both control system 1031 and Ethernet/IP LAN 1041. Ethernet/IP LAN 1041 exchanges Ethernet/IP packets with both Ethernet/IP PBX 1042 and HQ employee user system 1043. Thus, a second Ethernet/IP system is comprised of end-user system 1043, Ethernet/IP PBX 1042, and Ethernet/IP LAN 1041.

Remote employee user system 1010 and control system 1031 use proxy addressing to communicate with one another over an IP tunnel through IP connections 1051–1052 and service provider 1020. User system 1010 and control system 1031 use Subnetwork Bandwidth Manager (SBM) to provide admission control in the first Ethernet/IP system. User system 1010 and control system 1031 use IEEE 802.1P/1Q to provide packet prioritization and queuing in the first Ethernet/IP system. Virtual Local Area Networks (V-LANs) may be established in the first Ethernet/IP system to provide service differentiation for services, such as voice over IP, multimedia collaboration, video streaming, and file transfers. In the second Ethernet/IP system, user system 1043 and LAN 1041 use SBM to provide admission control and use IEEE 802.1P/1Q to provide packet prioritization and queuing. V-LANs may be established to provide service differentiation. One example of a product that could be used to implement at least some of these technologies is XP from Microsoft.

Systems 1010, 1030, and 1040 use Resource Reservation Set-up Protocol (RSVP) and Diffserv to manage end-to-end quality-of-service. RSVP is implemented in the first and second Ethernet/IP systems, and Diffserv is implemented in IP WAN 1032, so RSVP/Diffserv interfaces are utilized at WAN 1032 boundaries. IP WAN 1032 also implements admission control at its borders.

To implement communication service, the remote employee obtains IP service from service provider 1020. The end user also receives an end-user system 1010 IP address that remote service provider 1020 associates with end-user system 1010.

End-user systems 1010 and 1043 use Session Initiation Protocol (SIP) to set-up connections with one another through Ethernet/IP PBX 1042. On a voice call from the remote employee to the corporate HQ employee, end-user system 1010 generates a SIP message that is addressed to PBX 1042 and that includes the end-user system 1043 SIP address as the call destination. Once the SIP message is generated, end-user system 1010 embeds the PBX 1042 address in the body of the message and places the proxy address for control system 1031 in the header of the SIP message. User system 1010 transfers the SIP message to connection 1051. Based on the proxy IP address in the header, remote service provider 1020 routes the SIP message to peer-to-peer IP connection 1052.

Control system 1031 receives the SIP message with the proxy address in the header. Control system 1031 replaces the proxy address with the PBX 1042 SIP address embedded in the message. Control system 131 transfers this SIP message to IP WAN 1032. IP WAN 1032 transfers the SIP message to Ethernet/IP LAN 1041 for delivery to Ethernet/IP PBX 1042 based on the SIP address that is now in the header. PBX 1042 processes the SIP message to establish a voice session between user systems 1010 and 1043.

On a voice call from the corporate HQ employee to the remote employee, end-user system 1043 generates a SIP message that is addressed to Ethernet/IP PBX 1042 and that includes the end-user system 1010 SIP address as the call destination. Ethernet/IP LAN 1041 transfers the SIP message to Ethernet/IP PBX 1042. Ethernet/IP PBX 1042 processes the SIP message to establish a voice session between user systems 1010 and 1043.

To transfer a SIP message to end-user system 1010, Ethernet/IP PBX 1042 places the SIP address of end user system 1010 in the header. Ethernet/IP LAN 1041 and IP WAN 1032 transfer the SIP message to control system 1031 based on the end-user system 1010 SIP address. Control system 1031 replaces the SIP address with the end-user system 1010 IP address used by service provider 1020 and embeds the SIP address in the message. Control system 131 transfers the SIP message to peer-to-peer IP connection 1052. Remote service provider 1020 receives and routes the SIP message to end-user system 1010 over connection 1051 based on the end-user system 1010 IP address. End-user system 1010 replaces the end-user system 1010 IP address used by service provider 1020 with the SIP address and processes the SIP message in the normal manner.

For the transfer of voice packets from end-user system 1010 to end-user system 1043, end-user system 1010 embeds the end-user 1043 SIP address in the voice packets and places the proxy address of control system 1031 in the header. Control system 1031 replaces the proxy address with the end-user system 1043 SIP address. Control system 131 transfers the voice packets to IP WAN 1032. IP WAN 1032 transfers the voice packets to Ethernet/IP LAN 1041 for delivery to end-user system 1043 based on the SIP address now in the header.

For the transfer of voice packets from end-user system 1043 to end-user system 1010, end-user system 1043 places the SIP address of end user 1010 in the header. Ethernet/IP LAN 1041 and IP WAN 1032 transfer the voice packets to control system 1031 based on the SIP address. Control system 1031 replaces the SIP address with the end-user system 1010 IP address and embeds the SIP address in the voice packets. Control system 131 transfers the voice packets to peer-to-peer IP connection 1052. Remote service provider 1020 routes the voice packets to end-user system 1010 over connection 1051 based on the end-user 1010 IP address. End-user system 1010 replaces the end-user system 1010 IP address with the SIP address and processes the voice packets in the normal manner.

FIG. 11 illustrates another service example. The elements of FIG. 11 could be similar to like elements described above. End-user system 1110 is coupled to service provider 1120. Service provider is coupled to control system 1130 over peer-to-peer IP connection 1150. Control system 1130 is coupled to IP network 1135. IP network 1135 is coupled to destination system 1140. Service provider 1120 associates end-user system with a first end-user IP address and associates control system 1130 with a proxy IP address. Destination system 1140 associates end-user system 1110 with a second end-user IP address.

End-user system 1110 transfers a first set of IP packets to service provider 1120. These first IP packets are addressed to the proxy IP address for control system 1130 and include an embedded destination IP address for destination system 1140. Service provider 1120 transfers the first IP packets to peer-to-peer IP connection 1150 based on the proxy IP address. Control system 1130 receives the first IP packets from peer-to-peer IP connection 1150, replaces the proxy IP address with the destination IP address, and transfers the first IP packets to IP network 1135. IP network 1135 receives the first IP packets from control system 1130 and transfers the first IP packets to destination system 1140 based on the destination IP address.

Destination system 1140 transfers a second set of IP packets to IP network 1135. The second IP packets are addressed to end-user system 1110 using the second end-user IP address. IP network 1135 transfers the second IP packets to control system 1130 based on the second end-user IP address. Control system 1130 replaces the second end-user IP address with the first end-user IP address. Control system 1130 transfers the second IP packets over peer-to-peer IP connection 1150, and service provider transfers the second IP packets to end-user system 1110 based on the first end-user IP address.

What is claimed is:

1. A second service provider that is coupled to a first service provider over a peer-to-peer Internet Protocol (IP) connection and wherein the first service provider is coupled to end-user systems over IP connections, the second service provider comprising:

a packet telephony network configured to route service packets to provide telephony service;

a router configured to route a first set of IP packets between the peer-to-peer IP connection and a service connection based on a first set of IP addresses in the first set of the IP packets, and to route a second set of the IP packets between the peer-to-peer IP connection and an Internet backbone IP connection based on a second set of the IP addresses in the second set of the IP packets; and a service portal configured to exchange the first set of the IP packets with the service connection, provide protocol conversion between the first set of the IP packets and a first set of the service packets, and exchange the first set of the service packets with the packet telephony network.

2. The second service provider of claim 1 wherein the end-user systems exchange the first set of the IP packets including the first set of the IP addresses with the first service provider over the IP connections, and wherein the first service provider routes the first set of the IP packets to the second service provider over the peer-to-peer IP connection based on the first set of the IP addresses.

3. The second service provider of claim 2 wherein the first set of the IP packets from the end-user systems include packet telephony network addresses and the service portal replaces the first set of the IP addresses in the first set of the IP packets from the end-user systems with the packet telephony network addresses.

4. The second service provider of claim 2 wherein the service packets comprise ATM cells and the packet telephony network is configured to route the ATM cells to provide the telephony service.

5. The second service provider of claim 4 wherein the first set of the IP packets encapsulate the ATM cells.

6. The second service provider of claim 1 wherein the first set of the IP packets is not routed over a public Internet.

7. The second service provider of claim 1 wherein the first set of the IP packets carries telephony voice and signaling.

8. The second service provider of claim 1 wherein the first set of the IP addresses and the second set of the IP addresses comprise Class B addresses for the second service provider.

9. The second service provider of claim 1 wherein the first set of the IP addresses comprise Class B addresses for the packet telephony network in the second service provider.

10. The second service provider of claim 1 wherein the service portal is configured to use dynamically-assigned end-user IP addresses.

11. A method of operating a second service provider that is coupled to a first service provider over a peer-to-peer Internet Protocol (IP) connection and wherein the first service provider is coupled to end-user systems over IP connections, the method comprising:

routing a first set of IP packets between the peer-to-peer IP connection and a service connection based on a first set of IP addresses in the first set of the IP packets;

routing a second set of the IP packets between the peer-to-peer IP connection and an Internet backbone IP connection based on a second set of the IP addresses in the second set of the IP packets;

exchanging the first set of the IP packets with the service connection;

providing protocol conversion between the first set of the IP packets and a first set of service packets;

exchanging the first set of the service packets with the packet telephony network; and routing the service packets in the packet telephony network to provide telephony service.

12. The method of claim 11 wherein the end-user systems exchange the first set of the IP packets including the first set of the IP addresses with the first service provider over the IP connections, and wherein the first service provider routes the first set of the IP packets to the second service provider over the peer-to-peer IP connection based on the first set of the IP addresses.

13. The method of claim 12 wherein the first set of the IP packets from the end-user systems include packet telephony network addresses and wherein providing protocol conversion comprises replacing the first set of the IP addresses in the first set of the IP packets from the end-user systems with the packet telephony network addresses.

14. The method of claim 12 wherein the service packets comprise ATM cells and wherein routing the service packets comprises routing the ATM cells.

15. The method of claim 14 wherein the first set of the IP packets encapsulate the ATM cells.

16. The method of claim 11 wherein the first set of the IP packets is not routed over a public Internet.

17. The method of claim 11 wherein the first set of the IP packets carries telephony voice and signaling.

18. The method of claim 11 wherein the first set of the IP addresses and the second set of the IP addresses comprise Class B addresses for the second service provider.

19. The method of claim 11 wherein the first set of the IP addresses comprise Class B addresses for the packet telephony network in the second service provider.

20. The method of claim 11 further comprising using dynamically-assigned end-user IP addresses.

21. An Internet Protocol (IP) communication system wherein an end-user system is coupled to a service provider, wherein the service provider is coupled to the IP communication system over a peer-to-peer IP connection, wherein the service provider associates the end-user system with a first end-user IP address, wherein the end-user system transfers first IP packets to the service provider, wherein the first IP packets are addressed to a proxy IP address and include an embedded destination IP address, and wherein the service provider transfers the first IP packets to the peer-to-peer IP connection based on the proxy address, the IP communication system comprising:

a control system configured to receive the first IP packets from the peer-to-peer IP connection, replace the proxy IP address with the destination IP address, and transfer the first IP packets; and an IP network configured to receive the first IP packets from the control system and transfer the first IP packets based on the destination IP address.

22. The IP communication system of claim 21 wherein a destination system associates a second end-user IP address with the end-user, wherein the destination system transfers second IP packets to the IP network, wherein the second IP packets are addressed to the second end-user address, and wherein:

the IP network is configured to transfer the second IP packets to the control system based on the second end-user IP address; and the control system is configured to replace the second end-user IP address with the first end-user IP address and transfer the second IP packets over the peer-to-peer IP connection wherein the service provider transfers the second IP packets to the end-user system based on the first end-user IP address.

23. The IP communication system of claim 21 wherein:

the control system is configured to implement a Resource Reservation Set-up Protocol with the end-user system; and the IP communication network is configured to implement a Diffserv protocol with the end-user system.

24. The IP communication system of claim 21 wherein the control system is configured to implement Subnetwork Bandwidth Management (SBM) with the end-user system.

25. The IP communication system of claim 21 wherein the control system is configured to implement IEEE 802.1P/1Q with the end-user system.

26. A method of operating an Internet Protocol (IP) communication system wherein an end-user system is coupled to a service provider, wherein the service provider is coupled to the IP communication system over a peer-to-peer IP connection, wherein the service provider associates the end-user system with a first end-user IP address, wherein the end-user system transfers first IP packets to the service provider, wherein the first IP packets are addressed to a proxy IP address and include an embedded destination IP address, and wherein the service provider transfers the first IP packets to the peer-to-peer IP connection based on the proxy address, the method comprising:

receiving the first IP packets from the peer-to-peer IP connection;

replacing the proxy IP address with the destination IP address; and transferring the first IP packets based on the destination IP address.

27. The method of claim 26 wherein a destination system associates a second end-user IP address with the end-user, wherein the destination system transfers second IP packets to the IP communication system, wherein the second IP packets are addressed to the second end-user address, and further comprising:

transferring the second IP packets based on the second end-user IP address;

replacing the second end-user IP address with the first end-user IP address; and transferring the second IP packets over the peer-to-peer IP connection wherein the service provider transfers the second IP packets to the end-user system based on the first end-user IP address.

28. The method of claim 26 further comprising implementing a Resource Reservation Set-up Protocol and a Diffserv protocol with the end-user system.

29. The method of claim 26 further comprising implementing Subnetwork Bandwidth Management (SBM) with the end-user system.

30. The method of claim 26 further comprising implementing IEEE 802.1P/1Q with the end-user system.

* * * * *

UNITED STATES PATENT AND TRADEMARK OFFICE
CERTIFICATE OF CORRECTION

PATENT NO. : 6,751,216 B2
DATED : June 15, 2004
INVENTOR(S) : Harold W. Johnson and Warren B. Cope It is certified that error appears in the above-identified patent and that said Letters Patent is hereby corrected as shown below:

Drawings,
Sheet 10, Fig. 10, the reference numeral "1041" for the E-NET/IP PBX should read -- 1042 --;
Sheet 11, Fig. 11, the reference numeral "1135" for the DESTINATION SYSTEM should read -- 1140 --.

Column 6,
Line 48, each occurrence of "end-user systems 530, 540, 550" should read -- end-user systems 430, 440, 450 --.
Lines 57-58, "packet telephony network 313" should read -- packet telephony network 513 --.

Column 7,
Lines 7 and 29-30, each occurrence of "end-user systems 530, 540, 550" should read -- end-user systems 430, 440, 450 --.

Signed and Sealed this

Third Day of May, 2005

JON W. DUDAS
*Director of the United States Patent and Trademark Office*